(12) United States Patent
Tucker et al.

(10) Patent No.: US 7,184,411 B2
(45) Date of Patent: Feb. 27, 2007

(54) SWITCH-MANAGEMENT AGENT TRAP SCHEME IN AN INFINIBAND-ARCHITECTURE SWITCH

(75) Inventors: S. Paul Tucker, Ft Collins, CO (US); Venitha L Manter, Fort Collins, CO (US)

(73) Assignee: Palau Acquisition Corporation (Delaware), Santa Clara, CA (US)

( * ) Notice: Subject to any disclaimer, the term of this patent is extended or adjusted under 35 U.S.C. 154(b) by 1032 days.

(21) Appl. No.: 10/321,233

(22) Filed: Dec. 17, 2002

(65) Prior Publication Data

US 2004/0114531 A1    Jun. 17, 2004

(51) Int. Cl.
*H04L 1/16* (2006.01)
*H04L 3/14* (2006.01)
*H04L 12/56* (2006.01)
*H04L 12/28* (2006.01)
*H03M 13/00* (2006.01)

(52) U.S. Cl. .................. 370/252; 370/411; 370/462; 714/752

(58) Field of Classification Search .......... 370/252, 370/230, 235, 236, 469, 462, 447; 714/23, 714/43, 752; 455/427, 406, 411
See application file for complete search history.

(56) References Cited

U.S. PATENT DOCUMENTS

| | | | |
|---|---|---|---|
| 6,898,752 B2* | 5/2005 | Tucker | 714/752 |
| 7,035,220 B1* | 4/2006 | Simcoe | 370/236 |
| 2002/0085493 A1* | 7/2002 | Pekkala et al. | 370/235 |

* cited by examiner

*Primary Examiner*—Chi Pham
*Assistant Examiner*—Prenell Jones
(74) *Attorney, Agent, or Firm*—Borden Ladner Gervais LLP

(57) ABSTRACT

An infiniband architecture switch, includes a plurality of ports each configured to receive switch parameters, identify at least one data-packet error condition responsive to the switch parameters, generate a trap-initialization signal when the at least one data-packet error condition matches a trap-error condition, and a switch manager configured to receive the trap-initialization signal. A method for generating a switch manager control signal includes identifying at least one data-packet error condition in an infiniband architecture switch, determining when the at least one data-packet error condition matches a trap-error condition, generating a trap-initialization signal responsive to the trap-error condition, and forwarding the trap-initialization signal to a switch manager.

15 Claims, 8 Drawing Sheets

PORT & DATA-PACKET ERRORS

| ERROR COUNTER | SIZE | REQ'D | TRAP | DESCRIPTION |
|---|---|---|---|---|
| PORTRCVERRORS | 16 | YES | NO | # OF PACKETS WITH AN ERROR RECEIVED AT THIS PORT |
| PORTXMITPKTDISCARDS | 16 | YES | NO | # OF OUTBOUND PACKETS DISCARDED |
| PORTSTATECHANGE | 1 | YES | YES | SET ON LINK STATE MACHINE TRANSITIONS |
| PKEYIN | 8 | NO | YES | PKEY IN ERROR RATE |
| PKEYOUT | 8 | NO | YES | PKEY OUT ERROR RATE |
| DROPRATE | 8 | NO | YES | PORT RECEIVE ERRORS & PACKET CHECK FAILURES |
| VL15DROP | 8 | NO | NO | VL15 PACKETS DROPPED |
| PACKET TOO SHORT | 4 | NO | NO | PACKET LENGTH < MIN. |
| PACKET TOO LONG | 4 | NO | NO | PACKET LENGTH > MTU |
| PACKET LEN | 4 | NO | NO | APL != LRH |
| VL NOT SUPPORTED | 4 | NO | NO | VL NOT IN OPVL |
| VCRC | 4 | NO | NO | VCRC != VCRC FROM PACK |
| FCCRC | 4 | NO | NO | FCCRC != FCCRC FROM PACKET |
| LVER | 4 | NO | NO | LVER FIELD INVALID |
| IPVERS | 4 | NO | NO | IPVERS INVALID |
| TVER | 4 | NO | NO | TVER INVALID |
| OPCODE | 4 | NO | NO | LINK OPCODE INVALID |
| BUFFER OVERRUN | 4 | NO | NO | LENGTH > VL CREDITS |
| DISPARITY/ENCODING | 4 | NO | NO | PHY ERRORS |
| VL15 & GRH OR RAW | 4 | NO | NO | VL15 AND (GRH OR RAW) |
| MULTICAST & VL15 | 4 | NO | NO | MCAST IS DLID 0xC000-0xFFFE |
| ROUTING TABLE ENTRY INVALID | 4 | NO | NO | FROM ARBITER GRANT BUS |
| DESTINATION OUT OF RANGE | 4 | NO | NO | FROM ARBITER GRANT BUS |

FIG. 4A

PORT & DATA-PACKET ERRORS (cont.)

| ERROR COUNTER | SIZE | REQ'D | TRAP | DESCRIPTION |
|---|---|---|---|---|
| NEIGHBOR MTU EXCEEDED | 4 | NO | NO | FROM ARBITER GRANT BUS |
| VL MAP ENTRY INVALID | 4 | NO | NO | FROM ARBITER GRANT BUS |
| SWITCH LIFETIME TIMEOUT | 4 | NO | NO | FROM ARBITER GRANT BUS |
| HEAD OF QUEUE TIMEOUT | 4 | NO | NO | FROM ARBITER GRANT BUS |
| OUTPUT PORT INACTIVE | 4 | NO | NO | FROM ARBITER GRANT BUS |
| OPORT EQUALS IPORT | 4 | NO | NO | OPORT=IPORT & PORT !=0 |
| RAW INBOUND DISCARDS | 4 | NO | NO | RAW INBOUND PACKET DISCARDS |
| RAW OUTBOUND DISCARDS | 4 | NO | NO | RAW OUTBOUND PACKET DISCARDS |
| LINKERROR RECOVERY COUNTER | 16 | NO | NO | TIMES LINK WAS DOWN AND RECOVERED |
| LINKDOWNED COUNTER | 16 | NO | NO | TIMES LINK WAS DOWN AND DID NOT RECOVER |
| SYMBOL ERRORS COUNTER | 16 | NO | NO | FROM PHY |
| SYMBOL ERRORS IN LANE | 8 | NO | NO | FROM PHY |

FIG. 4B

PORT & DATA-PACKET ERROR TRAP ENCODING 500

| FIRST IAL BYTE 510 | TRAP-ERROR CONDITION 520 |
| --- | --- |
| 0x1 | PORT STATE CHANGE |
| 0x2 | PARTITION KEY IN |
| 0x4 | PARTITION KEY OUT |
| 0x8 | DROP RATE |
| 0x10 | EXCESSIVE BUFFER OVERRUN |
| 0x20 | LOCAL LINK INTEGRITY |
| 0x40 | FLOW CONTROL TIMEOUT |
| ALL OTHERS | UNDEFINED |

FIG. 5

SWITCH-MANAGEMENT AGENT TRAP SCHEME IN AN INFINIBAND-ARCHITECTURE SWITCH

TECHNICAL FIELD

The present invention generally relates to data communications. More specifically, the invention relates to a system and method for responding to errors in an InfiniBand™ architecture switch operable in a switching fabric of a network.

BACKGROUND

The evolution and popularity of computing devices and networking place an ever increasing burden on data servers, application processors, and enterprise computers to reliably move greater amounts of data between processing nodes as well as between a processor node and input/output (I/O) devices. These trends require higher bandwidth and lower latencies across data paths and place a greater functional burden on I/O devices, while simultaneously demanding increased data protection, higher isolation, deterministic behavior, and a higher quality-of-service than that which until recently has been unavailable.

The InfiniBand™ architecture specification describes a first-order interconnect technology for interconnecting processor nodes and I/O nodes in a system-area network. The architecture is independent of the host operating system and processor platform. The InfiniBand™ architecture (IBA) is designed around a point-to-point switched I/O fabric, where end-node devices, which can range from inexpensive I/O devices such as single integrated-circuit small-computer-system interface (SCSI) or ethernet adapters to complex host computers, are interconnected by cascaded switch devices. The IBA defines a switched communications fabric allowing multiple devices to concurrently communicate with high bandwidth and low latency in a protected and remotely managed environment. The physical properties of the IBA interconnect support module-to-module connectivity, as typified by computer systems that support I/O module slots as well as chassis-to-chassis connectivity as typified by interconnecting computers, external data storage systems, local-area network (LAN) and wide-area network (WAN) access devices such as switches, hubs, and routers in a data center environment.

The IBA switched fabric provides a reliable transport mechanism where messages are queued for delivery between end nodes. Message content is left to the designers of end-node devices. The IBA defines hardware-transport protocols sufficient to support both reliable messaging (e.g., send/receive) and memory-manipulation semantics (e.g., remote direct memory access (DMA)) without software intervention in the data movement path. The IBA defines protection and error-detection mechanisms that permit IBA-based transactions to originate and terminate from either privileged kernel mode, to support legacy I/O and communication needs, or user space to support emerging interprocess communication demands.

Concerning error-detection and recovery mechanisms, the IBA requires implementation of two port-level counters for reporting packet-switching errors as well as a port state change error that initiates a switch interrupt. The counters receive numerous separate error-signal inputs that the IBA specification treats as a single error. This error-reporting methodology lacks the resolution to provide accurate information as to what condition in the switch actually caused the port-error counter to increment and does not provide a mechanism for communication path management.

Consequently, there is a need for solutions that address these and/or other shortcomings of the prior art, while providing a manufacturable working device compliant with the IBA error reporting standard.

SUMMARY

A representative infiniband architecture switch includes a plurality of ports each configured to receive switch parameters, identify at least one data-packet error condition responsive to the switch parameters, and generate a trap-initialization signal when the at least one data-packet error condition matches a trap-error condition, and a switch manager configured to receive the trap-initialization signal.

A representative method for generating a switch manager control signal includes, identifying at least one data-packet error condition in an infiniband architecture switch, determining when the at least one data-packet error condition matches a trap-error condition, generating a trap-initialization signal responsive to the trap-error condition, and forwarding the trap-initialization signal to a switch manager.

A representative method for processing an SMA trap signal includes, receiving a trap-initialization signal responsive to an error condition from at least one of a plurality of ports of an infiniband architecture switch, communicating a read request of port information from the at least one port in response to the trap-initialization signal, receiving an encoded representation of the trap-error condition within port information, and decoding the representation of the trap-error condition.

BRIEF DESCRIPTION OF THE DRAWINGS

Many aspects of the system and method for data-packet error monitoring in an IBA switch can be better understood with reference to the following drawings. The emphasis in the drawings is upon clearly illustrating the principles of data-packet error monitoring in an infiniband switch. Consequently, components in the drawings are not necessarily to scale. Moreover, in the drawings, like reference numerals designate corresponding parts throughout the several views.

FIGS. 4A and 4B present a table of data-packet errors that can be monitored by the switch of FIG. 3;

FIG. 5 is a table of port level and data-packet errors configured to initiate a subnet management agent (SMA) trap;

DETAILED DESCRIPTION

Figure 1:
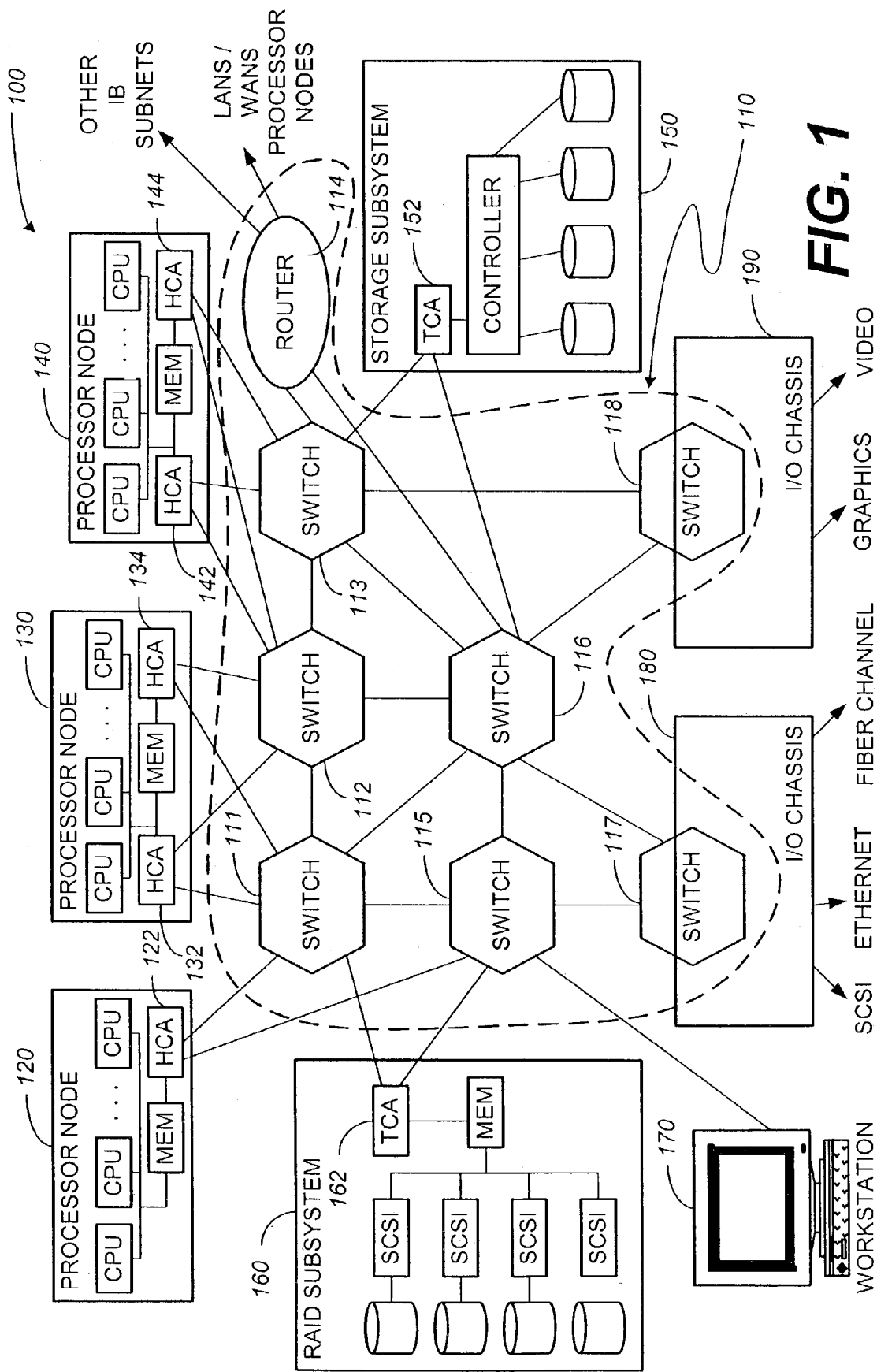
FIG. 1 is a schematic diagram of an IBA system area network.

A system and method suitable for implementing data-packet error monitoring in an IBA switch provides a mechanism for more closely monitoring, and in some instances, automatically responding to data-packet errors that is not provided in the IBA protocol for error recording. The IBA protocol requires port-level error counting. More specifically, the IBA protocol requires the each port to record each instance of a port receive error and a port transmit error. Port receive errors include the number of data packets containing an error received at the port. Port transmit errors include the number of outbound data packets discarded by the port. Because port-level errors are recorded as an integer number of packet failures at the port interface, a subnet management agent (SMA) has no way of determining the nature of the condition that caused the port error(s). Consequently, a network manager has no information other than the number of packets that were received with errors and/or discarded at the interface of the port.

A data-packet error monitor provides a low-overhead detailed look into the operation of a switch. The data-packet error monitor complies with infiniband error-recording requirements by providing the required IBA port-error counters. In addition, the data-packet error monitor includes a number of specific error counters that enable a subnet agent to ascertain the nature, quantity, and/or frequency of specific data-packet errors in each port of an IBA switch. Data-packet errors are conditions internal to the port. Data-packet errors are indicative of link-layer failures, recoverable link-layer conditions, as well as conditions observed at the physical layer (PHY) of the port and within the arbiter or switch manager of the switch. Error counters are incremented upon detection of an associated data-packet error condition, with the IBA required port-error counter simultaneously incremented.

Once data-packet errors are identified, recorded, and forwarded, a SMA will have some visibility into the present operating status of each switch coupled to an IBA system area network. However, no mechanism is presently provided within the IBA to enable a SMA to respond in an appropriate manner as called for by the forwarded error condition.

An SMA trap processing scheme provides a mechanism for interrupting nominal operation of a port or ports within an identified switch. Once the port or ports associated with the underlying error conditions are interrupted a SMA coupled to the switch can respond accordingly.

Each port is provided a dedicated trap signal output that is coupled to a switch manager. When a trap signal is generated and applied on the trap signal output, indicating that at least one of a set of trap error conditions has occurred, the switch manager logs the condition in a register. The register is configured to allow multiple traps to occur simultaneously across the ports of a switch in the case when more than one port has a trap condition. Although other servicing orders are possible, the switch manager services trap conditions in accordance with a predetermined priority order. Servicing and or otherwise responding to a trap signal consists of requesting data from the interrupting port(s) via an internal access loop. The port encodes the trap type in a particular byte of the response data. Once the trap has been identified and associated with the originating port, the switch manager can perform specific tasks related to the trap at the originating port. Some switch manager tasks can include routing data packets through another port with a redundant link to the node device.

FIG. 1 is a schematic diagram of an IBA system area network. To address the limitations associated with the industry standard architecture (ISA) bus and the peripheral component interconnect (PCI) bus for network connectivity, IBA was developed. As illustrated in FIG. 1, system area network 100 includes a plurality of processor nodes 120, 130, and 140 communicatively coupled with storage subsystem 150, redundant array of inexpensive disks (RAID) subsystem 160, and I/O chassis 180, 190 via switching fabric 110. Switching fabric 110 is composed of identical switching building blocks interconnected using the IBA topology. More specifically, switching fabric 110 comprises a collection of switches, links, and routers that connect a set of channel adapters. In the system area network 100 of FIG. 1, switching fabric 110 includes switches 111–113 and 115–118, and router 114. Router 114 connects system area network 100 to other IBA subnets, WANs, LANs, or other processor nodes.

In accordance with the IBA, system area network 100 is independent of a host operating system and specific processor platforms or architectures. Consequently, processor nodes 120, 130, and 140 can include an array of central processing units (CPUs) of similar or dissimilar architectures. In addition, the network coupled CPUs can be operating under the same or different operating systems.

Processor node 120 is coupled to switching fabric 110 via host channel adapter (HCA) 122. HCA 122 has redundant communication links to switching fabric 110 via switch 111 and switch 115. Processor nodes 130 and 140 each include a pair of HCAs 132, 134 and 142, 144, respectively each with redundant communication links to switching fabric 110. Adapters are devices that terminate a communication path across switching fabric 110. A communication path is formed by a collection of links, switches, and routers used to transfer data packets from a source channel adapter to a destination channel adapter. Adapters execute transport-level functions to communicate with processor nodes 120, 130, and 140 and other subsystems coupled to system area network 100. In addition to HCAs, system area network 100 includes target channel adapters (TCAs) that complete links between storage subsystem 150, redundant array of inexpensive disks (RAID) subsystem 160, and switching fabric 110. TCAs terminate links to I/O devices. For example, TCA 152 completes the link between storage subsystem 150 and switching fabric 110. TCA 162 completes the link between switching fabric 110 and RAID subsystem 162.

I/O chassis 180 is in communication with switching fabric 110 via switch 117. Similarly, I/O chassis 190 is in communication with switching-fabric 110 via switch 118. I/O chassis 180 and V/O chassis 190 are examples of a single host environment where the switching fabric 110 serves as a private I/O interconnect and provides connectivity between the I/O chassis' CPU/memory complex (not shown) and a number of I/O modules. In this regard, I/O chassis 180 supports links to a small computer system interface (SCSI) device, an ethernet device, and a fiber channel. I/O chassis 190 supports links to support a graphics display device and a video display device.

System area network 100 is scalable by communicating with other IBA subnets via one or more routers such as router 114. End nodes (e.g., processor node 120, storage subsystem 150, RAID subsystem 160, workstation 170, I/O chassis 180, 190, etc. within system area network 100 can be interconnected via a single subnet or multiple subnets. System area network 100 can be monitored and managed by one or more software modules distributed across the network. For example, a subnet management agent (not shown) operating on workstation 170 coupled to switching fabric 110 via a link to switch 115 can be used to monitor and control data transfers between any two end nodes coupled via switching fabric 110.

Node to node communication paths across system area network 100 are dedicated to transporting data packets between the designated nodes across dedicated links and switches within switching fabric 110. Consequently, the full bandwidth capacity of each path is available for data communication between the two node devices. This dedication eliminates contention for a bus, as well as delays that result from heavy loading conditions on shared bus architectures.

Intra-subnet routing is provided by switches 111–113 and 115–118. In operation, each data packet includes a local route header that identifies a destination address. Switches 111–113 and 115–118 forward data packets in accordance with the destination address. However, switches 111–113 and 115–118 are not directly addressed during the transport of data packets across nodes. Instead, data packets traverse switches 111–113 and 115–118 and the associated links virtually unchanged. To this end, each destination or node within the system area network 100 is typically configured with one or more unique local identifiers, which define a path through switching fabric 110. Data packets are forwarded by switches 111–113 and 115–118 through the use of forwarding tables located within each switch 111–113 and 115–118. The table in each switch 111–113 and 115–118 is configured by a subnet management agent operating on workstation 170. When data packets are received by switches 111–113 and 115–118, the data packets are forwarded within the,respective switch to an outbound port or ports based on the destination local identifier and the forwarding table within the respective switch.

Router 114 is the fundamental device responsible for inter-subnet routing. Router 114 forwards data packets based on a global route header located within the data packet. Router 114 replaces the local route header of the data packet as the data packet passes from subnet to subnet across the system area network 100. Routers such as router 114 interconnect subnets by relaying data packets between the subnets of system area network 100 until the packets arrive at the designated destination subnet.

Figure 2:
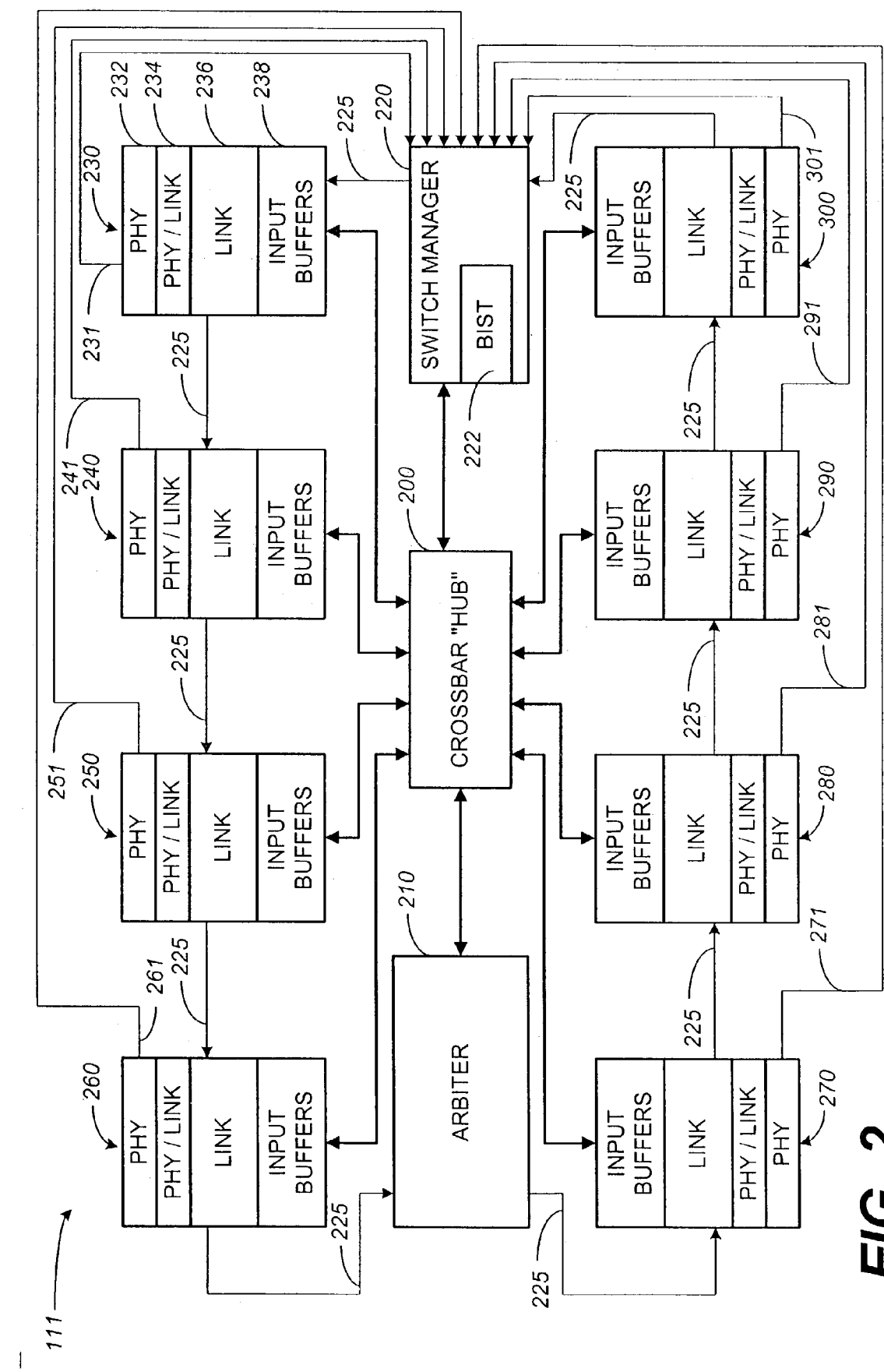
FIG. 2 is a block diagram of an embodiment of a switch within the network of FIG. 1.

FIG. 2 is a functional block diagram of an embodiment of a switch within the system area network of FIG. 1. Switch 111 includes ports 230, 240, 250, 260, 270, 280, 290, and 300. Switch 111 further includes a crossbar or "hub" for completing a communication channel from a source port to a destination port. Arbiter 210 and switch manager 220 coordinate switch resources and internal communications.

Each port 230, 240, 250, 260, 270, 280, 290, and 300 communicates with an end node (not shown) and with crossbar 200. For example, port 230 communicates with an end node via physical layer or PHY 232. Port 230 is communicatively coupled with another port within switch 111 via input buffers 238 and crossbar 200. Although FIG. 2 illustrates an eight-port switch, more or less ports can be supported by switch 111.

As further illustrated in FIG. 2, port 230 and each of the remaining ports 240, 250, 260, 270, 280, 290, and 300 are configured with a link layer 236 and a PHY/link interface 234. PHY 232 is operable to perform functions necessary to interface with various end nodes of system area network 100 (FIG. 1). PHY/link interface 234 provides an interface between physical switch operation and logical switch operation. Link 236 contains the functionality related to the transfer of data packets to a remote port across crossbar 200. Input buffers 238 perform switch specific operations related to sending and receiving data packets across crossbar 200.

Arbiter 210 and switch manager 220 manage requests for transport across the switch (arbitration) and ensure that the switch 111 transports data-packets across crossbar 200 without contention while meeting the requirements of data packets originated from a plurality of end users. BIST 222 supports a built-in self-test that verifies nominal operation of the crossbar 200 and each of the ports 230, 240, 250, 260, 270, 280, 290, and 300.

Switch manager 220 communicates with each of the ports 230, 240, 250, 260, the arbiter 210, as well as ports 270, 280, 290, and 300 via internal access loop 225. Internal access loop 225 provides a mechanism for switch manager 200 to request port information. For example, requests for link layer parameters from port 240 are communicated along internal access loop 225 in a counter-clockwise fashion from switch manager 220 through port 230. When the request arrives at port 240, the port recognizes the request and responds by forwarding one or more requested parameters along the internal access loop 225 to switch manager 220. Those skilled in the art will recognize that an internal access loop 225 can be configured to direct requests from switch manager 220 and receive associated responses in a clockwise fashion across the ports 230, 240, 250, 260, 270, 280, 290, and 300 and arbiter 210.

In addition to communicating with port 230 via internal access loop 225, switch manager 220 is configured to receive a trap-initialization signal along dedicated port-trap conductor 231. Each of the remaining ports 240, 250, 260, 270, 280, 290, and 300 are configured with a respective port-trap conductor 241, 251, 261, 271, 281, 291, and 301 coupled to switch manager 220. Each of the ports generates and forwards a trap-initialization signal along its respective port-trap conductor to switch manager 220 when the port identifies one or more designated port and/or data-packet error conditions. The trap-initialization signal is issued once a designated error condition is identified. A second trap-initialization signal is issued if the port identifies a separate trap-error condition.

Figure 3:
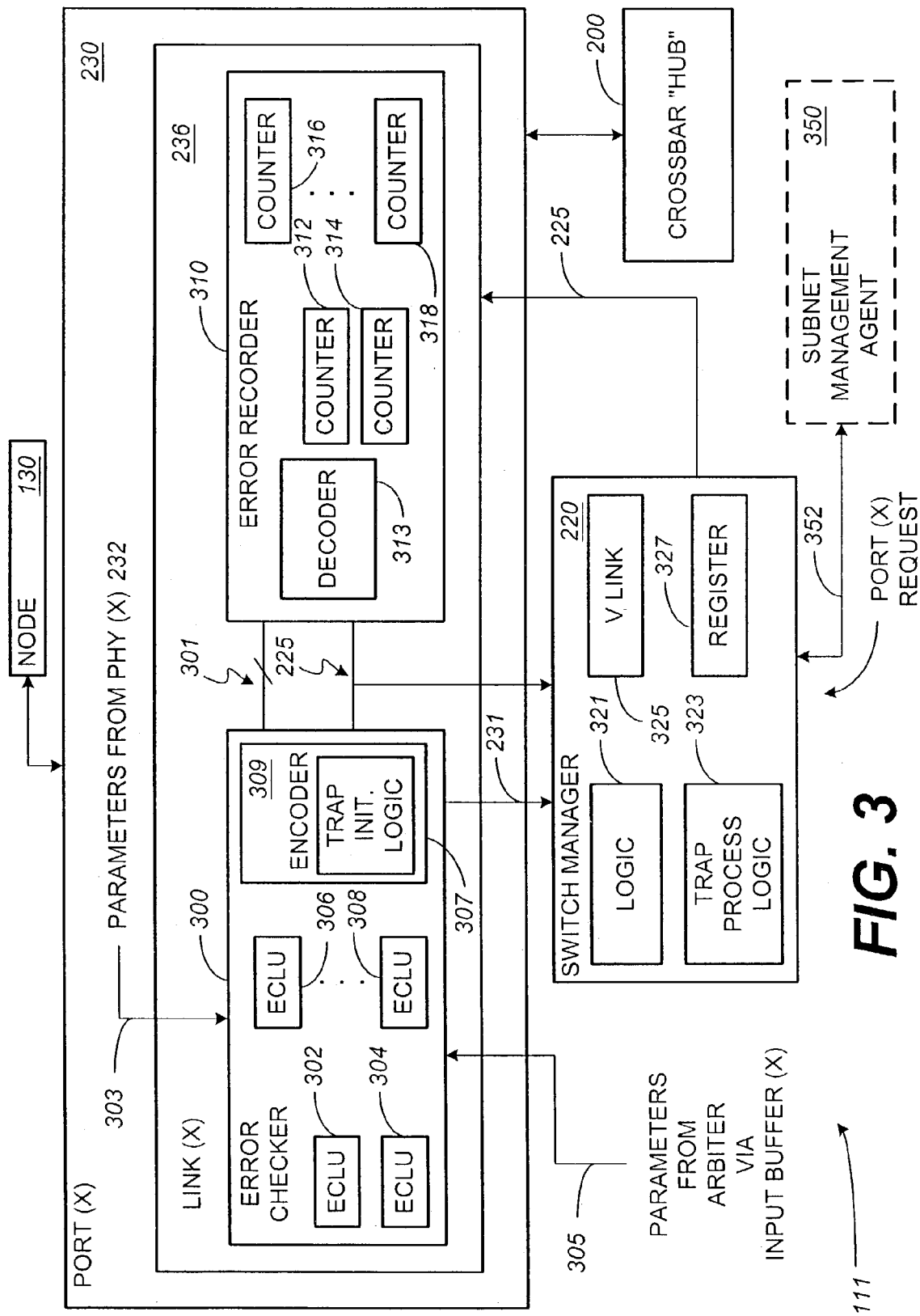
FIG. 3 is a block diagram of an embodiment of a port within the switch of FIG. 2.

FIG. 3 is a functional block diagram of an embodiment of switch 111. Port 230, which is one of a plurality of ports within switch 111, is a hardware device configured to transport data packets from crossbar 200 (FIG. 2) to coupled node 130 (FIG. 1) or from coupled node 130 to crossbar 200. Operation of port 230 is monitored by switch manager 220 via internal access loop 225. Switch manager 220 includes logic 321 configured to communicate with each of the ports 230, 240, 250, 260, 270, 280, 290, and 300, the crossbar 200, and the arbiter 210 as well as to receive and process port information requests via communication path 352.

Trap-process logic 323 is configured to issue a port information read request of ports 230, 240, 250, 260, 270, 280, 290, and 300, along internal access loop 225 in response to a trap-initialization signal received from any of the ports 230, 240, 250, 260, 270, 280, 290, and 300. Trap-process logic. 323 is further configured to take corrective action as may be desired once the originating port communicates the trap-error condition to switch manager 220. Trap-process logic 323 is configured to address specific trap-error conditions in a predetermined order. The predetermined order can be based on the relative severity of the underlying error condition.

Virtual link 325 stores a forwarding table associating a source port with a destination port for one or more identified communication paths supported by switch 111. Register 327 is a storage device for holding information received from each of the ports 230, 240, 250, 260, 270, 280, 290, and 300. The information in register 327 includes port errors and data-packet errors and when a trap-error condition exists, the information includes a representation of the trap-error condition.

FIG. 3 shows port 230 configured to identify and record data-packet errors in link layer 236. In this regard, link layer 236 includes an error checker 300 and an error recorder 310 communicatively coupled via an output bus 301. Error checker 300 receives one or more parameters 303 from the associated PHY 232 and one or more parameters 305 from arbiter 210 (FIG. 2). Error checker 300 applies the parameters 303, 305 to a plurality of dedicated error condition logical units (ECLUs) 302, 304, 306, 308. Each of the dedicated ECLUs 302, 304, 306, 308 applies one or more of the parameters 303, 305 to its respective internal logic to determine if a specific error condition exists. For example, ECLU 302 is configured to determine when a data-packet length in bytes exceeds a path maximum transfer unit defined by a number of payload bytes. When an ECLU determines that an error condition exists, the ECLU sends a flag to encoder 309, which applies the flag to output bus 301.

Single thresholds as well as lower and upper range limits can be configured as defaults associated with each of the respective ECLUs 302, 304, 306, 308. Alternatively, thresholds and range limits can be configured during an initialization of switch 111 with values other than the defaults being sent and stored within the respective ECLUs 302, 304, 306, 308. Once the thresholds and range limits are provided to each respective ECLU, the ECLUs 302, 304, 306, 308 can monitor for the occurrence of one or more input signal parameters indicative of an error condition.

Encoder 309 includes trap-initialization logic 307 configured to generate and issue a trap-initialization signal along port-trap conductor 231 when specific error conditions are identified by one or more ECLUs 302, 304, 306, 308 of error checker 300. For example, trap-initialization logic 307 is configured to generate and issue a trap-initialization signal when one or more ECLUs 302, 304, 306, 308 identify one or more trap-error conditions 520 identified in table 500 of FIG. 5.

Error recorder 310 receives the encoded indication of the error condition at decoder 311. Decoder 311 forwards the indicated error condition to an associated counter 312, 314, 316, 318 which increments a value stored in the counter. When switch manager 220 receives a port status request for port(x) 230 from subnet management agent 350, the switch manager 220 forwards the request along the internal access loop 225 to port 230. Upon receiving the request, error recorder 310 forwards the present value of each of the dedicated error counters 312, 314, 316, 318 i.e., the port and data-packet errors, via the internal access loop 225 to register 327.

The port and data-packet errors are buffered in register 327 until switch manager 220 forwards the errors and/or the subnet management agent 350 pulls the errors from register 327. It should be understood that while the illustrated embodiment shows a set of four dedicated ECLUs 302, 304, 306, and 308 associated with a set of four counters 312, 314, 316, and 318 other embodiments including configurations with other numbers of ECLU-counter pairs to monitor and record port and data-packet errors are possible. It should be further understood that the architecture described above for identifying and recording error conditions can be configured to support the IBA required port-level error reporting standard while simultaneously providing a mechanism for recording and reporting data-packet error conditions within an IBA switch. Simultaneous recording of port errors and data-packet errors can be arranged by coupling appropriate signals from output bus 301 to both a port-error counter and a data-packet error counter as desired.

In some embodiments, the information stored in register 327 can be distributed across multiple registers not shown for simplicity of illustration. For example, a port-error register can be arranged to store the present values of counters dedicated to port-errors. One or more registers can be arranged to store the present value of counters dedicated to data-packet receive errors. Other registers can be arranged to store the present values of counters dedicated to data-packet transmit errors and/or miscellaneous data-packet errors.

Switch 111 can be configured and monitored via a communicatively coupled subnet management agent 350. In the illustrated embodiment, subnet management agent 350 is coupled to switch manager 220 via communication path 352. Communication path 352 can be confined to a local subnet or can traverse subnets as might be desired to configure thresholds and range limits to monitor port and data-packet error conditions in remote switches across system area network 100 (FIG. 1). In typical embodiments, subnet management agent 350 is one or more software modules operable on one or more workstations or other computing devices such as workstation 170 (FIG. 1) coupled to switching fabric 110.

FIGS. 4A and 4B present a table of port and data-packet errors that can be identified, recorded, and reported by an appropriately configured error checker 300 and error recorder 310 in the link layer 236 of port 230 within switch 111 (FIG. 3). Table 400 includes a set of port and data-packet errors described as a dedicated error counter and the size of the counter in bits. Table 400 further includes entries that indicate whether IBA requires the error condition to be observed and recorded, whether a trap or switch interrupt is triggered by the error condition, as well as a brief description of the condition responsible for the error.

The first three entries detail port-level error conditions that are required under the IBA. The first two of these port-level error conditions count the number of data packets with an error received at the port and the number of outbound packets discarded by the port. The third port-level error condition reports that the port has changed its state in response to a link layer state machine transition. The third port-level error condition initiates a trap or interrupt that suspends operation of the port while the switch manager 220 initiates or otherwise configures the port in accordance with the link layer state machine.

The remaining error conditions detail representative data-packet error conditions that can be identified and recorded within the link layer of the associated port. For example, the PKEYIN counter increments each time the associated ECLU identifies that the partition key could not be correctly communicated to a port. In other words, the received partition key at the port does not match the desired value. A partition is a collection of ports that are configured to communicate with one another. A partition key is a value stored in channel adapters coupled to the ports that can be used to determine membership in a particular partition. The PKEYOUT counter increments each time the associated ECLU identifies that the partition key reported from a channel adapter coupled to the port did not match an expected value.

The first three data-packet error conditions i.e., the fourth through sixth entries from the top of table 400 are configured to initiate a trap or interrupt signal. The trap is triggered by logic within switch manager 220 that is responsive to the various error conditions. The trap can be reported along with the initiating error condition via register 327 to the subnet management agent 350 in the manner described above.

A host of other data-packet error conditions are described in the remaining entries of table 400. It should be understood that switch 111 is not limited to identifying and recording only those data-packet error conditions identified in table 400. Suitably configured IBA switches could identify and record one or more data-packet error conditions using the error checker and error recorder illustrated and described in FIG. 3.

Reference is now directed to FIG. 5, which presents a table 500 of port and data-packet errors. Specifically, table 500 includes a number of trap-error conditions 520 and a representation 510 associated with each of the trap-error conditions 520. Trap-error conditions 520 are port and data-packet errors indicative of a port condition that should be avoided during data-packet transfers and/or error conditions that need to be corrected before resuming nominal data-packet transfers across ports of switch 111. For example, the PKEYIN and PKEYOUT error conditions described above are representative data-packet errors that when identified within trap-initialization logic 307 (FIG. 3) result in the error checker 300 issuing a trap-initialization signal to switch manager 220 along port-trap conductor 231. Trap-process logic 323 within switch manager 220 issues a port information read request along internal access loop 225 to determine which of the port(s) issued the trap-initialization signal. Encoder 309 responds to the port information request by forwarding the encoded representation 510 associated with the error condition. Trap-process logic 323 and software modules within subnet management agent 350 use the encoded error condition representation to identify and/or appropriately respond to the associated error condition.

Table 500 identifies specific trap-error conditions 520 and an associated representation 510 that can be communicated via internal access loop 225 to switch manager 220. It should be understood that additional error conditions including those identified and not identified in table 400 of FIGS. 4A and 4B can be processed in a similar manner to interrupt nominal operation of a port or ports in an IBA switch as may be desired. It should be further understood that the particular representations 510 illustrated in table 500 as being communicated in the first internal access loop message byte are for example only. Other representations and encoding methods are possible.

Figure 6:
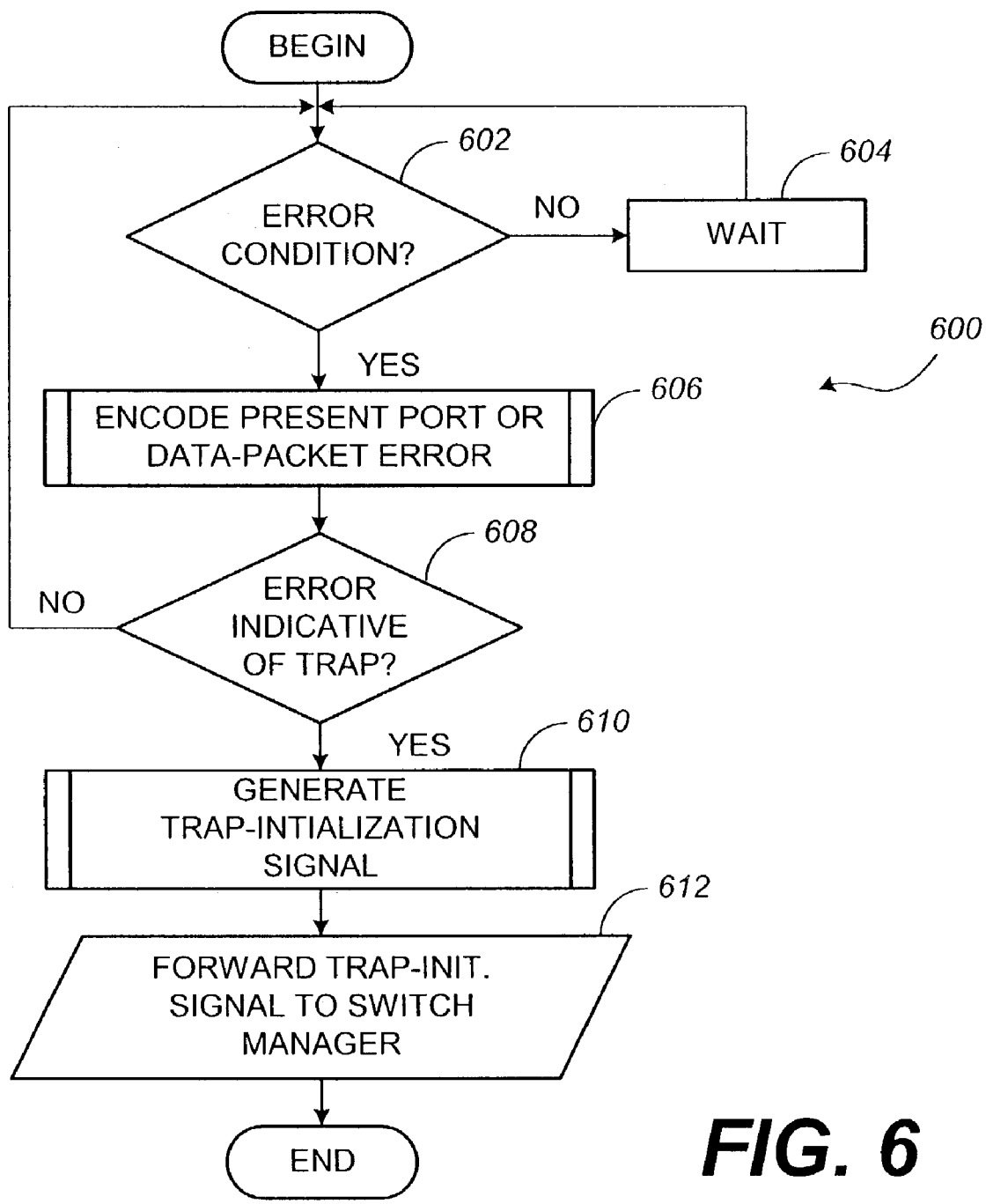
FIG. 6 is a flow diagram illustrating an embodiment of a method for generating an SMA trap signal in response to a data-packet error condition of FIG. 5.

Reference is now directed to FIG. 6, which presents a flow diagram illustrating an embodiment of a method 600 for generating a SMA trap signal. In this regard, the representative method 600 begins with decision block 602 where a determination is made whether a data-packet error condition exists. When it is determined that no data-packet errors exist as indicated by the flow control arrow labeled, "NO" exiting determination block 602 flow returns to the determination block 602 after processing an appropriate delay in accordance with wait block 604. Otherwise, when a data-packet error condition is identified as indicated by the flow control arrow labeled, "YES" exiting determination block 602 flow continues with process 606, which encodes the presently identified data-packet error.

Next, a determination is made whether the error condition identified in block 602 and encoded in block 606 is an error condition that requires a SMA trap as indicated in determination block 608. When the error condition identifies a port or data-packet error that requires switch manager or SMA intervention as indicated by flow control arrow labeled, "YES" exiting determination block 608, a trap-initialization signal is generated as shown in block 610. Otherwise, when the error condition does not require switch manager or SMA intervention as indicated by flow control arrow labeled, "NO" exiting determination block 608, method 600 may repeat blocks 602 through 606.

When a trap-initialization signal is generated as indicated in block 610, the trap-initialization signal is forwarded to a switch manager as indicated in block 612. Method 600 repeats blocks 602 through 612 during those periods when the switch is operating in a data-packet transfer mode. Method 600 is terminated when the switch is reset, power is removed, or as otherwise desired.

Figure 7:
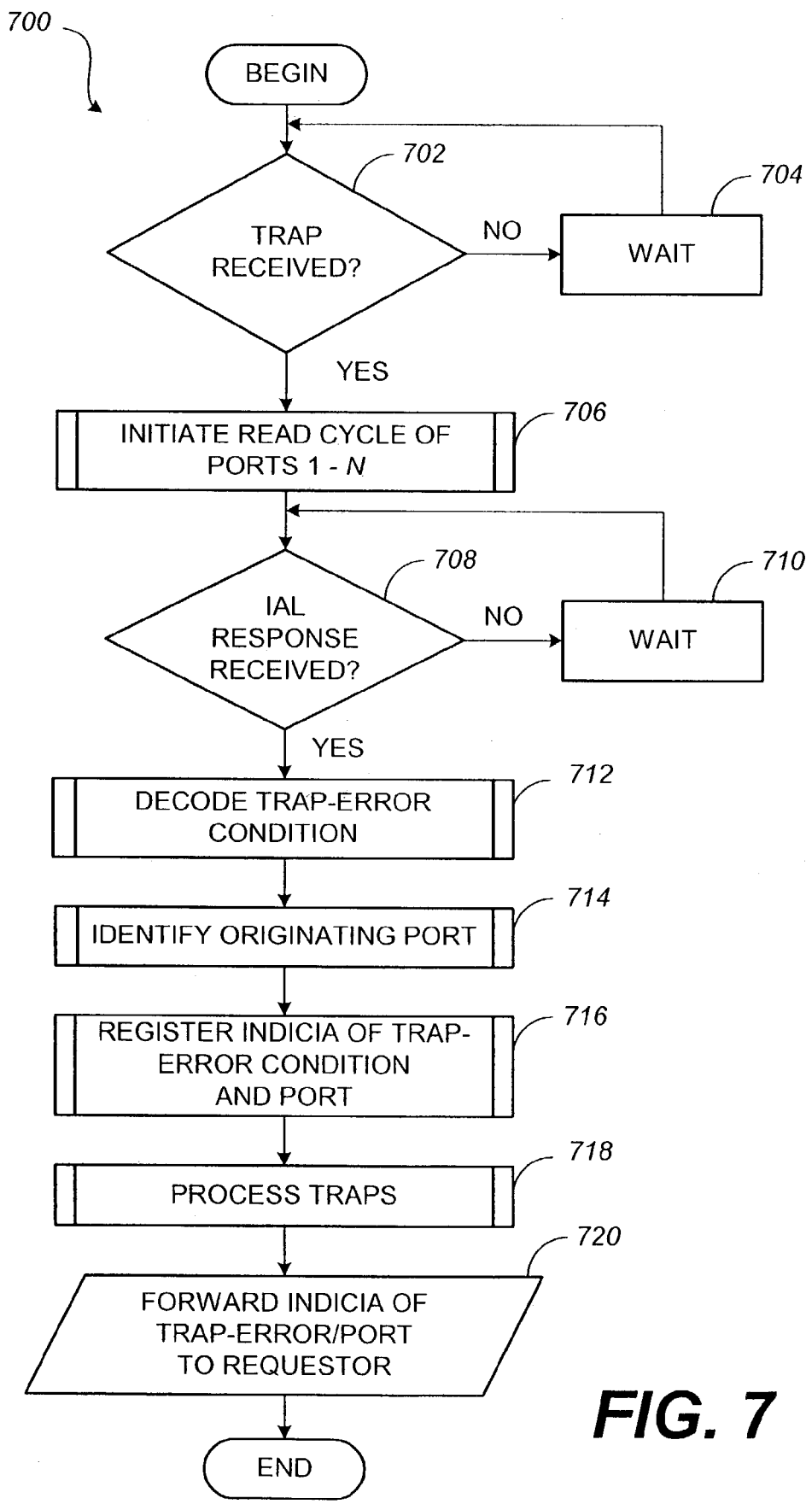
FIG. 7 is a flow diagram illustrating an embodiment of a method for responding to the SMA trap signal of FIG. 6.

FIG. 7 presents a flow diagram illustrating an embodiment of a method 700 for responding to a SMA trap signal. In this regard, the representative method 700 begins with decision block 702 where a determination is made whether a trap-initialization signal has been received. When it is determined that a trap-initialization signal has not been received as indicated by the flow control arrow labeled, "NO" exiting determination block 702 flow returns to the determination block 702 after processing an appropriate delay in accordance with wait block 704. Otherwise, when a trap-initialization signal is received as indicated by the flow control arrow labeled, "YES" exiting determination block 702 flow continues with block 706, which initiates a read cycle of the ports within the switch.

Next, a determination is made whether an internal access loop message containing specific port information from the port that sent the trap-initialization signal has been received as indicated in determination block 708. When it is determined that an internal access loop message has not been received as indicated by the flow control arrow labeled, "NO" exiting determination block 708 flow returns to determination block 708 after processing an appropriate delay in accordance with wait block 710. Otherwise, when an internal access loop message from the port that sent the trap-initialization signal is received, as indicated by the flow control arrow labeled, "YES" exiting determination block 708 flow continues with block 712 where the trap-error condition is decoded. Thereafter, in blocks 714, 716, and 718 a switch manager identifies the originating port, stores indicia of the originating port and the trap-error condition, and responds to the trap condition(s). As indicated in block 720 a switch manager may be further configured to forward indicia of the trap-error condition and the originating port to an external requester.

The system and method for implementing a switch management agent trap scheme in an IBA switch can be embodied in different forms. The embodiments shown in the drawings and described in the detailed description below detail specific embodiments presented for purposes of illustration and description. The specific embodiments are not intended to be exhaustive or limit the system and method for implementing switch management agent trap generation and processing in an IBA switch to the specific embodiments shown and described. Modifications or variations are possible in light of the above teachings.

The embodiment or embodiments were selected and described to provide the best illustration of the principles of the system and method and its practical application to thereby enable one of ordinary skill in the art to use both in various embodiments and modifications as suited to the particular use contemplated. All such modifications and variations, are within the scope of the system and method as determined by the appended claims when interpreted in accordance with the breadth to which they are fairly and legally entitled.

We claim:

1. An infiniband architecture switch, comprising:
a plurality of ports each configured to receive switch parameters, identify at least one data-packet error condition responsive to the switch parameters, and generate a trap-initialization signal when the at least one data-packet error condition matches a trap-error condition; and
a switch manager configured to receive the trap-initialization signal.

2. The switch of claim 1, wherein each of the ports comprises an error checker.

3. The switch of claim 2, wherein each of the plurality of ports further comprises:
an error recorder communicatively coupled to the error checker wherein the error recorder stores a representation of the data-packet error conditions.

4. The switch of claim 1, wherein switch parameters originate in a physical layer (PHY) of each of the ports.

5. The switch of claim 1, wherein switch parameters originate in the switch manager.

6. The switch of claim 1, wherein switch parameters originate in an arbiter.

7. The switch of claim 1, wherein the switch manager comprises trap-process logic configured to initiate a port-error information request.

8. The switch of claim 7, wherein the port-error information request is communicated to the port via an internal access loop.

9. The switch of claim 7, wherein the port responds to the port-error information request by generating a representation of the trap-error condition.

10. The switch of claim 9, wherein the port forwards the representation of the trap-error condition via the internal access loop.

11. The switch of claim 10, wherein the switch manager is configured to store the representation of the trap-error condition.

12. The switch of claim 11, wherein the switch manager forwards the representation of the trap-error condition in response to a request issued by a subnet management agent.

13. A method for generating a switch manager control signal, comprising:
identifying at least one data-packet error condition in an infiniband architecture switch;
determining when the at least one data-packet error condition matches a trap-error condition;
generating a trap initialization signal responsive to the trap-error condition; and
forwarding the trap initialization signal to a switch manager.

14. The method of claim 13, wherein forwarding comprises applying the trap-initialization signal to a port dedicated input of the switch manager.

15. The method of claim 13, wherein determining comprises applying indicia of a data-packet error condition to trap-error condition logic.

* * * * *